United States Patent [19]

Hose

[11] 3,740,748

[45] June 19, 1973

[54] ELECTRONIC IMAGE CANCELLATION FOR DOPPLER RECEIVERS

[75] Inventor: Eddy Hose, Los Angeles, Calif.

[73] Assignee: Hughes Aircraft Company, Culver City, Calif.

[22] Filed: May 31, 1968

[21] Appl. No.: 736,927

[52] U.S. Cl. .......... 343/8
[51] Int. Cl. .......... G01s 9/44
[58] Field of Search .......... 343/8

[56] References Cited

UNITED STATES PATENTS 3,103,009 9/1963 Baker .......... 343/8 X

*Primary Examiner*—Samuel Feinberg
*Assistant Examiner*—G. E. Montone
*Attorney*—W. H. MacAllister, Jr. and George Jameson

[57] ABSTRACT

A double channel pulsed doppler radar receiver utilizing, in one embodiment, double mixing in each channel in which an oscillator having quadrature signal outputs is coupled between respective mixers in each channel for each mixing action involved, so that any remaining image noise component appearing at the output of the mixers is cancelled in a summing circuit.

12 Claims, 7 Drawing Figures

INVENTOR
EDDY HOSE,
BY
Walter J. Adam
ATTORNEY.

ELECTRONIC IMAGE CANCELLATION FOR DOPPLER RECEIVERS

BACKGROUND OF THE INVENTION

This invention relates to electronic image cancellation circuits and particularly to an electronic image cancellation circuit for cancelling the second image noise in a doppler receiver. The invention herein described way made in the course of or under a contract with the United States Air Force.

Doppler receivers are presently being used in fire-control, navigation, ground mapping, tracking, etc., systems to provide range, angle and/or velocity information. With the use of doppler radar equipments to accomplish these objectives the problem of image noise arises. Image noise is that noise created in the doppler receiver due to the mixing processes involved in converting or translating the frequency of the doppler radar return signals in steps to the baseband frequencies required for demodulation. Each mixing process has an image noise problem. If noise is present at the image frequency, it will be superimposed on the mixing product. In most receivers image noise is present only at the front end, ahead of the first mixer. This image noise can be removed by filtering ahead of the first mixer. Some general purpose receivers employ filter networks, such as preselection and postselection filters, to reject this image noise.

In a doppler radar, in coherent side-looking radar, and possibly in special types of communications systems the desired information is contained in the frequency of the carrier. Because of hardware considerations it may be desirable or necessary to measure the variations of the carrier frequency around an offset audio tone rather than around a zero frequency. The offset audio tone represents the nominal frequency of the carrier. The carrier frequency shift is the difference between the frequency of the received signal and the offset frequency. In such systems additional image noise may appear at the final mixer. This noise is present whenever the signal spectrum at the input to the final mixer is wider than the audio offset frequency. This condition is certain to occur in all pulse-doppler radars, coherent SLR's and pulse coded FM communications equipments. It may also occur in CW doppler radars and coherent CW FM communications equipments. As a result this additional image noise doubles the noise around the video carrier. This result is equivalent to increasing the noise figure of the receiver by 3 decibels (3db). In the receivers of systems herebefore described, it is not possible to decrease the intermediate frequency (IF) bandwidth of the signal spectrum and thereby exclude the image noise, due to the fact that this would narrow the bandwidth of the signals at the IF frequencies and therefore destroy the pulse shape required for range resolution. At the present time there are no known doppler receivers which employ an electronic image cancellation circuit to eliminate the second image noise. Furthermore, there are no known pulse doppler receivers which use an electronic image cancellation circuit to eliminate either the first or second image noise. Thus a need exists for an electronic image cancellation circuit to reject the second image noise and improve the receiver sensitivity in all doppler receiver systems.

SUMMARY OF THE INVENTION

Briefly, applicant has provided an improved and inexpensive electronic image cancellation circuit for improving the sensitivity of a doppler receiver by electronically cancelling the second image noise that is produced in the demodulation of the doppler return signals.

It is therefore an object of this invention to provide an improved doppler radar receiver.

Another object of this invention is to provide an electronic image cancellation circuit to cancel the second image noise in doppler receivers.

Another object of this invention is to provide a circuit for improving the sensitivity in all coherent radar systems.

A further object of this invention is to provide a circuit for reducing the noise in doppler receivers.

A still further object of this invention is to provide an economical circuit for cancelling image noise produced in the demodulation of doppler radar return signals.

BRIEF DESCRIPTION OF THE DRAWINGS

These and other objects, features and advantages will become more apparent to those skilled in the art when taken into consideration with the following detailed description wherein like reference numerals indicate like or corresponding parts throughout the several views wherein.

DETAILED DESCRIPTION OF THE PREFERRED EMBODIMENTS

Figure 1:
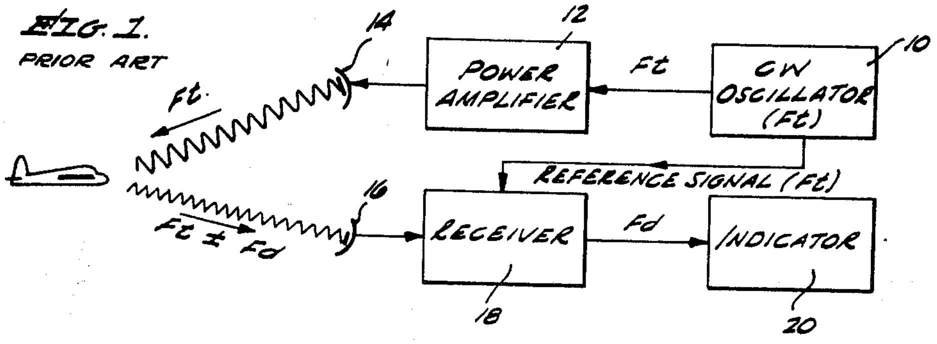
FIG. 1. PRIOR ART
FIG. 1 is a schematic block diagram of a simplified CW doppler radar system.

Referring now to the drawings, FIG. 1 illustrates in block diagram form a basic CW doppler radar system. A continuous wave (CW) oscillator 10 generates a signal at the CW radio frequency of transmission $F_t$. Power amplifier 12 is coupled to oscillator 10 in order to amplify $F_t$ before $F_t$ is applied to antenna 14 for radiation into space in the form of a narrow beam of energy. Antenna 14 may be an azimuth scan type for use in target searching. A second antenna 16, positioned in fixed relationship to antenna 14, is utilized to receive that energy reflected back from the target. This energy, or echo signal, is shifted in frequency from the signal at the transmitted frequency $F_t$ by the doppler frequency $F_d$. A CW doppler receiver 18 is connected to antenna 16 for extracting the doppler frequency $F_d$ from the echo signal. Oscillator 10 is also coupled to receiver 18 in order to supply a reference signal which takes the place of a local oscillator. This reference signal is required in all coherent radar systems to remember the phase of the transmitted signal in order to detect the doppler frequency shift. Indicator 20 is coupled to the output of receiver 18 for visually presenting the doppler information on indicator 20.

Figure 2:
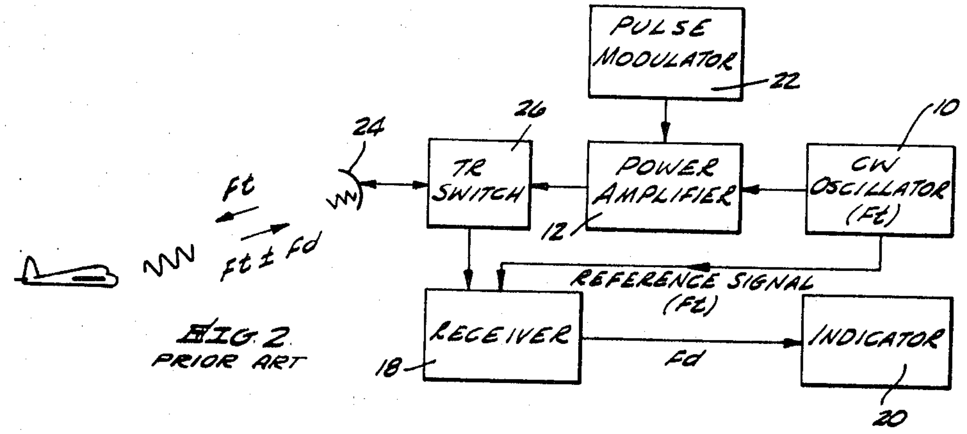
FIG. 2. PRIOR ART
FIG. 2 is a schematic block diagram of a simplified pulsed doppler radar system.

FIG. 2 illustrates in block diagram form a basic pulse doppler radar system. Basically this system differs from that of FIG. 1 in that pulse modulator 22 is connected to power amplifier 12 to turn amplifier 12 on and off for the purpose of generating pulses of radio frequency energy for transmission. For this reason only one antenna is required for both the transmit and receive operations. A transmit-receive (TR) switch or tube 26 is inserted between power amplifier 12 and antenna 24 to protect receiver 18 from the high power output of amplifier 12. During transmission the TR tube 26 is ionized, which blocks the receiver from the transmitted power. A short time after power amplifier 12 has been pulsed, TR tube 26 deionizes and opens the receiver for the reception of the radar echo signal. The function and operation of the remaining parts of the system of FIG. 2 have been discussed in connection with the system of FIG. 1.

A problem arises in the circuitry involved in detecting the doppler frequency shift information in the receiver 18 of FIGS. 1 and 2. This is due to the generation of image noise in the receiver.

Figure 3:
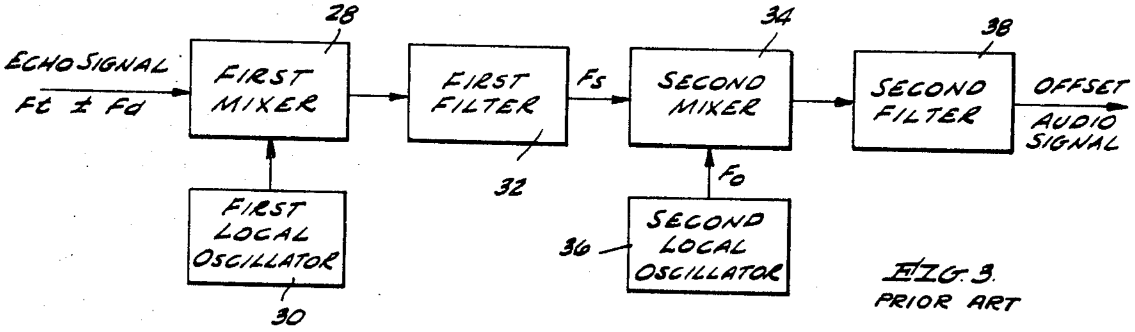
FIG. 3. PRIOR ART
FIG. 3 is a schematic block diagram of a conventional frequency translation circuit used in the doppler radar receivers of FIGS. 1 and 2.
Figure 4:
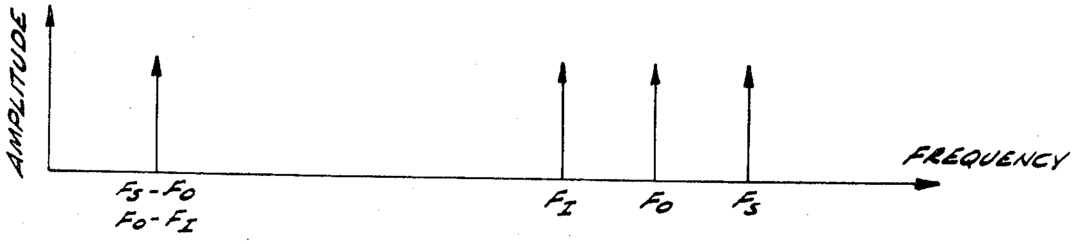
FIG. 4. PRIOR ART
FIG. 4 is a graph of the frequency spectrum involved in the second mixing action of the CW doppler radar receiver of FIG. 1.
Figure 5:
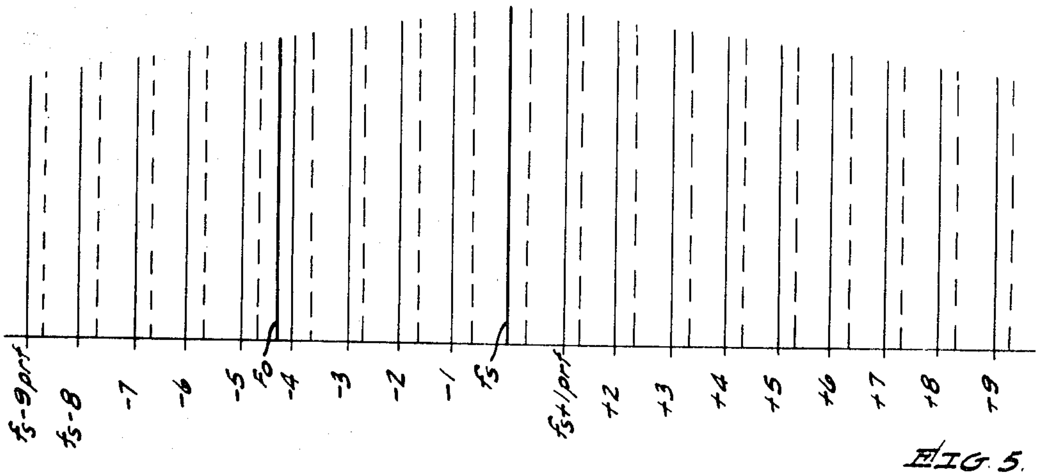
FIG. 5 PRIOR ART
FIG. 5 is a graph of the frequency spectrum involved in the second mixing action of the pulsed doppler radar receiver of FIG. 2.

This problem will now be discussed with reference to FIGS. 3, 4, and 5. FIG. 3 illustrates in block diagram form a simplified conventional system for the frequency translation of the echo signal down to audio signals as the baseband frequencies. A filter (not shown) may be connected in the signal path immediately preceding the first mixer 28 in order to reject any first image noise that may be present. The echo signal containing the doppler information is applied to first mixer 28. First local oscillator 30, which may be oscillator 10 in FIGS. 1 and 2, is connected to mixer 28 in order to apply an oscillator signal to mix with the echo signal. First low pass filter 32 is connected to mixer 28 in order to remove the original and the sum frequency signals of the output of mixer 28. The signal at the difference frequency, or first intermediate frequency ($F_s$), is passed through filter 32 and applied to second mixer 34. A second local oscillator 36, having an output at the frequency $F_O$, is connected to second mixer 34 for heterodyning of the signal at the first intermediate frequency $F_s$ down to the offset audio tone, around which the variations of the carrier frequency, or doppler information, is now contained. A second low pass filter 38 is connected to the output of second mixer 34 in order to reject the original and sum frequency signals of the output of mixer 34. The output of filter 38 is a video carrier containing the doppler information and is applied to either conventional angle tracking circuits or doppler filter processing banks.

The following comments should be noted at this point. The circuitry of FIG. 3 may contain amplifiers (not shown) for amplifying the output signals of each mixer. Also, the oscillators 30 and 36 of FIG. 3 are phase coherent with the oscillator 10 in FIG. 1 or FIG. 2 so that the receiver 18 can detect the doppler frequency shift. Furthermore, in pulse doppler systems, the second mixer 34 can also serve as a range by gating the signal from the second oscillator 36 into the mixer 34 only during the time the signal is received. This rejects the receiver noise when the signal is not present.

In the circuitry of FIG. 3 the problem arises in the mixing or heterodyning of the two signals $F_s$ and $F_O$, applied to the second mixer 34. FIG. 4 illustrates the spectrum, or sequentially arranged frequency distribution, of the frequencies involved in the second mixing action of second mixer 34 of FIG. 3. Noise is distributed throughout the frequency spectrum, but only that noise appearing at the second image frequency $F_I$ is troublesome. This is referred to as the second image noise. It should be remembered that the first image noise was filtered out before the first mixing action in first mixer 28. The offset audio signal, or tone, at the difference frequency between the first intermediate frequency signal $F_s$ and the second oscillator (36) signal $F_O$, $F_s-F_O$, contains the doppler frequency information. However, the offset audio signal at the difference frequency between the oscillator signal $F_O$ and the image frequency $F_I$, $F_O-F_I$, contains only noise and is therefore undesirable. Both offset audio signals, $F_s-F_O$ and $F_O-F_I$, are added together and amplified by the receiving system. This results in the doubling of the noise around the video carrier which increases the noise figure of the receiver by 3db. As a consequence, the sensitivity of the receiver is reduced by 3db.

Image noise is also a problem with pulse doppler radar systems. FIG. 5 illustrates the pulsed doppler received moving target echo spectrum, including the image noise, of the frequencies involved in the second mixing action of the pulsed doppler radar receiver of FIG. 2. This type of spectrum is well known by those familiar with pulsed doppler radar systems. $F_s$ represents the first intermediate frequency (IF) signal of the doppler shifted echo signal and $F_O$ represents the second oscillator 36 signal. The remaining solid lines (spectral lines) represent the remaining parts of the complex signal $F_s$ containing the doppler information. These spectral lines represent energy contained at frequencies equal to $F_s$ plus or minus multiples of the pulse repetition frequency (PRF) of pulse modulator 22 (FIG. 2). The signal at each spectral line is displaced from the signal $F_O$ from the second local oscillator 36 in FIG. 3 by a particular intermediate frequency (IF). That second image noise which is displaced from the oscillator signal $F_O$ by that particular IF will be combined with the signal at the mirrored spectral line. This will have the same effect, as discussed previously, of increasing the noise figure and decreasing the sensitivity of the receiver by 3db. One overall operational effect of this image noise is to reduce the maximum radar range of the doppler radar system by approximately 16 percent.

The addition of the image noise in the conventional frequency translation circuit of FIG. 3 will now be shown by mathematical analysis.

Since $\omega = 2\pi f$, the frequencies of the various signals to be discussed will be referred to in terms of $\omega$. Using the phasor notation and referring to FIG. 3, the equations to be developed will use a single frequency in the radar echo signal, at the frequency $\omega_O$. It is to be understood, however, that the following mathematical analysis is also valid for any other frequency contained in the echo signal. To aid in the understanding of this mathematical analysis the following list of symbol definitions is now given.

$\overline{A}_1$ = the amplitude and phase of the echo signal at a particular frequency $\omega_0$.

$A_1$ = the amplitude of the echo signal at $\omega_0$.

$e$ = the base of the natural system of logarithms.

$j$ = an imaginary quantity used in the solution of alternating current problems (along with its complement $-j$) and plotted along the vertical axis (axis of imaginaries) in a system of coordinates.

$t$ = time.

$\overline{B}$ = the amplitude and phase of the output signal of the first oscillator at the frequency $\omega_1$.

$\overline{A}_2'$ = the amplitude and phase of the output signal of the first mixer, containing the sum and difference frequencies.

$\overline{N}_1$ = the amplitude and phase of the first image noise located at the frequency $\omega_{N_1}$.

$N_1$ = the amplitude of the first image noise located at $\omega_{N_1}$.

$\overline{A}_2$ = the amplitude and phase of the output signal of the first low pass filter, with the sum frequency filtered out.

$\overline{B}_2$ = the amplitude and phase of the output signal of the second local oscillator at the frequency $\omega_2$.

$N_2$ = the amplitude of the second image noise located at the frequency $\omega_{N_2}$.

$A_3$ = the amplitude and phase of the offset audio signal at the output of the final low pass filter.

The phasor notation for the amplitude and phase of the echo signal at the particular frequency $\omega_0$ is $\overline{A}_1$ which is defined by the following equation:

$$\overline{A}_1 = A_1\, e^{j\omega_0 t}$$

The result of the mixing process with the first oscillator signal $\overline{B}_1$ at a frequency of $\omega_1$ (where $\omega_0 > \omega_1$) is denoted by $$\overline{A}_2' = \overline{B}_1 \times (\overline{A}_1 + \overline{N}_1)$$

where $\overline{N}_1$ is the first image noise located at the frequency $\omega_{N_1}$, and $$\omega_1 - \omega_{N_1} = \omega_0 - \omega_1$$

After the sum frequency component is removed by first low pass filter the resultant equation is $$\overline{A}_2 = 1/2\ (A_1 + N_1)\ e^{j(\omega_0 - \omega_1)t}$$

The second mixing and filtering process with the second local oscillator (36) signal $\overline{B}_2$ is accomplished in the same manner as the first, yielding a final signal $$\overline{A}_3 = 1/4\ (A_1 + N_1 + N_2)\ e^{j(\omega_0 - \omega_1 - \omega_2)t}$$

It is apparent from an examination of the last equation that the addition of the image noise $N_1$ and $N_2$ to the signal $A_1$ increases the noise figure and decreases the sensitivity of the receiver. If the echo signal is passed through a filter before being applied to the first mixer, as mentioned previously, the $N_1$ term will be dropped out of all of the above equations. This will yield a final signal of $$\overline{A}_3 = 1/4\ (A_1 + N_2)\ e^{j(\omega_0 - \omega_1 - \omega_2)t}$$

The remaining second image noise $N_2$ component will degrade the receiving system by decreasing the receiver sensitivity by 3db thereby decreasing the reliability of the receiver.

Figure 6:
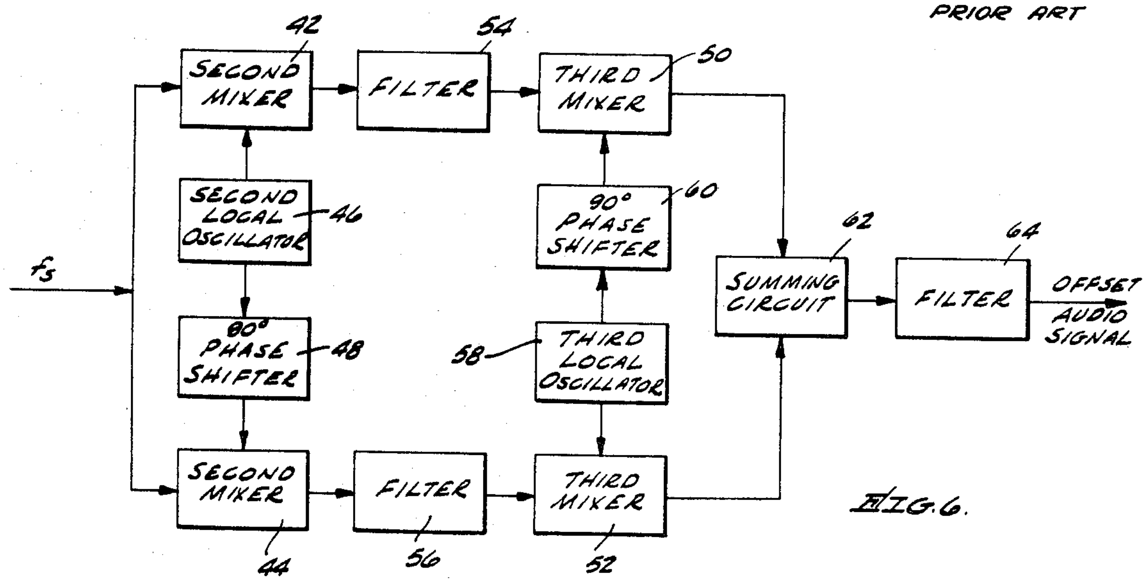
FIG. 6 is a schematic block diagram of an electronic image-cancellation frequency-translation circuit in accordance with one embodiment of this invention as used in doppler radar receivers.

Referring now to FIG. 6, a schematic block diagram is shown of a dual channel electronic image-cancellation circuit in accordance with one embodiment of this invention, as used in the doppler radar receivers of FIGS. 1 and 2. FIG. 6 does not show the first mixing action wherein the first IF signal, $F_s$, is produced, since this may be done in the conventional manner as described in connection with the circuitry of FIG. 3. No amplifiers are shown, but they may be included. The doppler shifted first IF signal $F_s$ is simultaneously applied to second mixers 42 and 44 which have their input circuits coupled together. Second local oscillator 46 produces dual output signals at the second local oscillator frequency $F_0$. Oscillator 46 is connected directly to second mixer 42 and coupled through a first 90° phase shifter circuit 48 to second mixer 44 in order to apply quadrature output signals to mixers 42 and 44. The second IF output signals of mixers 42 and 44 are at a frequency between the first IF and the offset audio signal, depending on the receiver requirements. The second IF output, or difference frequency, signal of each of mixers 42 and 44 contain both signal (doppler) and second image noise components. However, the signal component of the mixer 42 output lags the signal component of the mixer 44 output in phase by 90°. Also the second image noise component of the mixer 42 output leads the second image noise component of the mixer 44 output in phase by 90°. Mixers 42 and 44 are respectively coupled to third mixers 50 and 52 through narrow band filters 54 and 56 in order to remove the original and the sum frequencies of the mixer outputs before being mixed a third time. A third local oscillator 58, having dual output signals at the third local oscillator frequency, is connected directly to mixer 52 and coupled through a second 90° phase shifter circuit 60 to mixer 50 in order to apply quadrature signal outputs to mixers 50 and 52. The offset audio output signal of each of mixers 50 and 52 contains both signal (doppler) and second image noise components. However, there is no third image noise component in the offset audio signal because filters 54 and 56 also remove any noise that may occur at the third image frequency. A summing circuit 62 is connected to mixers 50 and 52 in order to compare these various components. The signal, or doppler, components of the offset audio signals of mixers 50 and 52 are in phase with each other, whereas the second image noise components of the offset audio signals of mixers 50 and 52 are 180° out of phase with each other. Therefore, the image noise components are cancelled while the signal components are added in summing circuit 62. Filter 64 is connected to the output of summing circuit 62 in order to pass only the added offset audio signals to the remaining circuits of the receiver; i.e., either conventional angle tracking circuits or doppler filter processing banks.

It should be noted that the filtering out of the original and sum frequencies of the outputs of mixers 50 and 52 could be accomplished before the summing of the various second IF components. Furthermore, all of the local oscillators used in conjunction with the circuitry of FIG. 6 are phase coherent with the oscillator 10 of the doppler receiver 18 in FIG. 1 or FIG. 2 so that the receiver 18 can detect the doppler frequency shift.

The cancellation of the second image noise in coherent radar receivers by the electronic image-cancellation circuit of FIG. 6 will now be shown by mathematical analysis, using the phasor notation. The equations to be developed will use a single frequency in the first IF signal at the frequency $\omega_1$. The following mathematical analysis is also valid for any other frequency contained in the first IF signal.

The list of symbol definitions previously given is still valid, subject to the following additions and modifications:

$A_2$ = the amplitude of the first IF signal.

$\overline{A}_2$ = the amplitude and phase of the first IF signal.

$\overline{U}_1 = 1/2\ \overline{A}_2$ = that portion of the first IF signal applied to mixer 42.

$\overline{U}_2$ = the amplitude and phase of the second IF signal at the output of filter 54.

$\overline{U}_3$ = the amplitude and phase of the offset audio signal at the output of mixer 50.

$\overline{L}_1 = 1/2\ \overline{A}_2$ = that portion of the first IF signal applied to mixer 44.

$\overline{L}_2$ = the amplitude and phase of the second IF signal at the output of filter 56.

$\overline{L}_3$ = the amplitude and phase of the second IF signal at the output of mixer 52.

$\overline{B}_2$ = the amplitude and phase of the output signal of the second local oscillator 46 at the frequency $\omega_2$.

$\overline{B}_3$ = the amplitude and phase of the output signal of the third local oscillator 58 at the frequency $\omega_3$.

$N_2$ = the amplitude of the second image noise located at the frequency $\omega_{N_2}$.

$\overline{N}_2$ = the amplitude and phase of the second image noise located at the frequency $\omega_{N_2}$.

$N_3$ = the amplitude of the third image noise located at the frequency $\omega_{N_3}$.

$\overline{N}_3$ = the amplitude and phase of the third image noise located at the frequency $\omega_{N_3}$.

$\overline{A}_3$ = the amplitude and phase of the offset audio signal at the output of the filter 64.

The U-channel is composed of second mixer 42, filter 54 and third mixer 50, while the L-channel is composed of second mixer 44, filter 56 and third mixer 52.

In the U-channel the incoming frist IF signal $U_1$ is mixed with second oscillator (46) signal $B_2$ and then narrow-band filtered to pass only the U-channel second IF signal $U_2$, where $$\overline{U}_2 = \overline{B}_2 \times (\overline{U}_1 + \overline{N}_2) = \tfrac{1}{4}\ [A_2\ e^{j(\omega_1-\omega_2)t} + N_2 e^{j(\omega_2-\omega_{N_2})t}]$$
$$= \tfrac{1}{4}\ (A_2 + N_2)\ e^{j(\omega_1-\omega_2)t}$$

The $\overline{U}_2$ signal is then mixed with a 90° phase shifted oscillator signal to produce the U-channel offset audio signal $\overline{U}_3$, where $$\overline{U}_3 = j\ \overline{B}_3 \times (\overline{U}_2 + \overline{N}_3) = \tfrac{1}{8}\ j\{(A_2 + N_2)\ [e^{j(\omega_1-\omega_2+\omega_3)t} - e^{j(\omega_1-\omega_2-\omega_3)t}] \quad + N_3\ [e^{j(\omega_3+\omega_{N_3})t} + e^{j(\omega_3-\omega_{N_3})t}]\}$$

In the L-channel, the incoming signal $\overline{L}_1$, is mixed with a 90° phase shifted oscillator signal to produce the L-channel second IF signal and then narrow-band filtered to pass only the L-channel second IF signal $\overline{L}_2$, where $$\overline{L}_2 = j\ \overline{B}_2 \times (\overline{L}_1 + \overline{N}_2) = \tfrac{1}{4}\ j\ [-A_2\ e^{j(\omega_1-\omega_2)t} + N_2 e^{j(\omega_2-\omega_{N_2})t}] = \tfrac{1}{4}\ j\ (N_2 - A_2)\ e^{j(\omega_1-\omega_2)t}$$

The $\overline{L}_2$ signal is then mixed with the oscillator signal $B_3$ to produce the L-channel offset audio signal $\overline{L}_3$, where $$\overline{L}_3 = \overline{B}_3 \times (\overline{L}_2 + \overline{N}_3) = \tfrac{1}{8}\ j\ \{ (N_2 - A_2)\ [e^{j(\omega_1-\omega_2+\omega_3)t} + e^{j(\omega_1-\omega_2-\omega_3)t}] + N_2\ [e^{j(\omega_3+\omega N_3)t} + e^{j(\omega_3-\omega N_3)t}]$$

The addition of $\overline{U}_3$ and $\overline{L}_3$ in summing circuit 62 then results in the cancellation of the terms involving the noise component $N_2$ which would appear at the frequency $\omega_1-\omega_2-\omega_3$. Subsequent low-pass filtering by filter 64 removes the components at the frequencies $\omega_1-\omega_2-\omega_3$ and $\omega_3+\omega_{N_3}$. The resulting expression then becomes $$\overline{A}_3 = \overline{U}_3 + \overline{L}_3 = \tfrac{1}{4}\ j\ (N_3 - A_2)\ e^{j(\omega_1-\omega_2-\omega_3)t}$$

*No* $N_1$ term appears in the output because the first image noise was filtered out before the first mixer. Also it should be remembered that since the $N_3$ component was filtered out by the filters 54 and 56, the final expression then becomes $$\overline{A}_3 = \overline{U}_3 + \overline{L}_3 = -\tfrac{1}{4}\ j\ A_2\ e^{j(\omega_1-\omega_2-\omega_3)t}.$$

It is therefore obvious that, by the cancellation of the image noise $N_2$, a 3db increase in the signal-to-noise-ratio of the radar doppler receiver is realized over the conventional frequency translation circuits used in doppler receivers.

Figure 7:
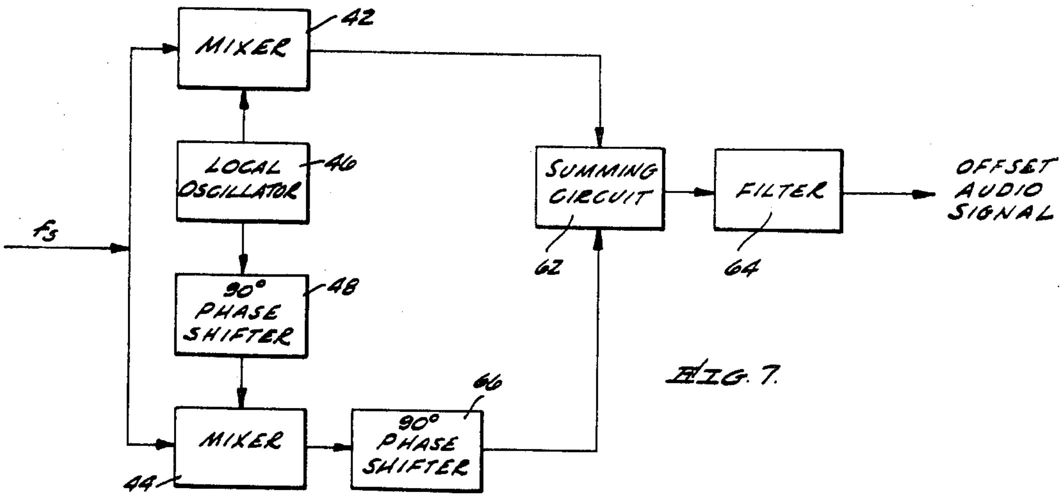
FIG. 7 is a schematic block diagram of an electronic image-cancellation frequency-translation circuit in accordance with a second embodiment of this invention as used in doppler radar receivers.

The schematic block diagram of FIG. 7 illustrates another embodiment of the invention as used in radar doppler receivers. Mixers 42 and 44, local oscillator 46, 90° phase shifter 48, summing circuit 62 and filter 64 perform the same functions as described in relation to FIG. 6. As described in relation to FIG. 6, the signal component of the mixer 42 output lags by 90° the signal component of the mixer 44 output, while the second image noise component of the mixer 42 output leads by 90° the second image noise component of the mixer 44 output. A 90° phase shifter 66 is coupled between mixer 44 and summing circuit 62 in order to shift the phase of the signal and second image noise components of the mixer 44 output by 90°. This brings the signal components in phase with each other, and also causes the second image noise components to be 180° out of phase with each other. The second image noise components are therefore cancelled in summing circuit 62 and only the signal components appear at the output of summing circuit 62. Filter 64 passes only the offset audio signal on to the other receiver circuits.

The invention thus provides an electronic image cancellation circuit for use in the frequency translation process of all types of doppler receivers. Since the second image noise appearing at the output of the second mixer(s) is cancelled, the sensitivity of the doppler receiver is improved by 3db, thereby allowing the doppler system to be operated at longer ranges. In addition, this invention could be used to cancel the first image noise instead of using a filter at the input of the first mixer.

What is claimed is:

1. An electronic image cancellation circuit for a doppler receiver for cancelling the image noise introduced into the receiver through the mixing of the first IF signal returns toward the offset audio signal, including in combination:

oscillator means for producing first and second coherent oscillator signals which are phase shifted from each other in a predetermined phase relationship;

mixer means adaptable to receive first IF signal returns and being coupled to said oscillator means for mixing the first IF signal returns with each of the first and second coherent oscillator signals from said oscillator means to produce first and second coherent offset audio signals; each of the first and second coherent offset audio signals having signal and image noise components that are respectively phase shifted from each other and respectively phase shifted from the corresponding signal and image noise components of the other; and summing means coupled to said mixer means and being responsive to the first and second coherent offset audio signals therefrom for summing the signal components and cancelling the image noise components thereof.

2. The electronic image cancellation circuit of claim 1 used in conjunction with a CW doppler radar receiver.

3. The electronic image cancellation circuit of claim 1 used in conjunction with a pulsed doppler radar receiver.

4. A doppler receiver including in combination, channel means having means for receiving transmitted signal return information, oscillator means for producing a plurality of output signals at preselected frequencies, phase shifting means coupled between said oscillator means and said channel means for incrementally phase-shifting selected ones of the output signals of said oscillator means and selectively applying them to said channel means, said channel means selectively mixing the signal return information and the phase shifted output signals of said oscillator means to audio frequencies, and summing means coupled to said channel means for summing the mixed signal return information and cancelling the signals at the image frequencies produced by the mixing of the signal return information with the oscillator signals.

5. A doppler receiver system including in combination:

first and second channels for translating signal returns to baseband frequencies, each of said channels having input and output terminals and including a plurality of mixers in sequential alignment, a plurality of oscillator means selectively coupled to said mixer means, each of said oscillator means having quadrature voltage outputs and selectively applying same to said mixer means, each of said input terminals coupled together for reception of the signal return, summing means coupled between said output terminals and responsive to the heterodyning of the signal returns with the quadrature outputs to produce output offset frequencies devoid of image noise.

6. The apparatus of claim 5 further including filter means coupled between adjacent ones of said mixers for passing a desired band of frequencies and filtering out undesired frequencies.

7. An electronic image frequency cancellation circuit for the receiver portion of a pulsed doppler radar system including in ombination:

first, second, third and fourth mixer circuits, each of said mixer circuits having signal, oscillator and output terminals, said signal terminals of said first and third mixer circuits connected together for receiving signal return information applied thereto, and said signal terminals of said second and fourth mixer circuits respectively coupled to said output terminals of said first and third mixer circuits for reception of output signals therefrom, first and second oscillator means having different respective output frequencies, each of said oscillator means having outputs of first and second phases, said first oscillator means coupled between said oscillator terminals of said first and third mixer circuits in order to supply its first and second phases to said first and third mixer circuits respectively, said second oscillator means coupled between said oscillator terminals of said second and third mixer circuits in order to apply its first and second phases to said fourth and second mixer circuits respectively, summing means having first and second input terminals coupled between said output terminals of said second and fouth mixer means for reception of signals therefrom, said first and third mixer circuits responsive to the application of the signal return information and the outputs of said first oscillator means to produce mixed signal return information containing both signal and image noise components at a first frequency and at different phases for respective application to said second and fourth mixer circuits, said second and fourth mixer circuits responsive to the application of said mixed signal return information and the outputs of said second oscillator means to produce phase shifted mixed signals containing both signal and image noise components at a second frequency for respective application to said summing means, said summing means responsive to the reception of the second mixed signals to add the in-phase signal components and cancel the out-of-phase image noise components.

8. The apparatus of claim 7 further including a first filter circuit coupled between said output terminal of said first mixer circuit and said signal terminal of said second mixer circuit, and a second filter circuit coupled between said output terminal of said third mixer circuit and said signal terminal of said fourth mixer circuit, and said first and second filter circuits passing a predetermined band of frequencies and rejecting all other frequencies.

9. An electronic image cancellation circuit for a doppler receiver including in combination:

first and second mixer means having means for receiving a radio frequency input signal, means for providing output quadrature signals being coupled between said first and second mixer means, each of said first and second mixer means being responsive to the reception of the input signal and one of the quadrature signals to produce an intermediate frequency signal having phase-shifted signal and image noise components, phase shifting means connected to said second mixing means for shifting the phase of the signal and image noise components from said second mixing means, and summation means coupled between said first mixing means and said phase shifting means in order to cancel the image noise components and add the signal components.

10. The means for providing output quadrature signals of the apparatus of claim 9 including:

oscillator means coupled to said first mixer means for providing a first signal thereto, and a further phase shifting means coupled between said oscillator means and said second mixer means for shifting the phase of a second signal from said oscillator means before applying same to said second mixer.

11. The apparatus of claim 10 further including filter means coupled to said summation means for rejecting all frequencies except the added signal components at the intermediate frequency.

12. The apparatus of claim 1 further including filter means coupled to said summing means for rejecting all frequencies except the summed signal components of the first and second coherent output signals.

* * * * *